Aug. 6, 1968     T. G. MILLER     3,395,601
WINGNUT DEVICE
Filed Aug. 31, 1966

INVENTOR.
TERRY G. MILLER
BY
Walter Leuca
ATTORNEY

United States Patent Office 3,395,601
Patented Aug. 6, 1968

3,395,601
WINGNUT DEVICE
Terry G. Miller, Lake County, Ind.
(3622 Oakdale Drive, Gary, Ind. 46403)
Filed Aug. 31, 1966, Ser. No. 576,449
1 Claim. (Cl. 85—32)

ABSTRACT OF THE DISCLOSURE

A nut for rapid manual tightening or loosening thereon on a screw shaft, provided with a radially extending and axially inclined lug, U-shaped lever pivotally connecting said lug and being movable to a diametral position relative to said nut straddling said screw shaft in order to obtain the maximum turning leverage and to utilize the screw shaft as a fulcrum. The lever is also movable toward an axial position relative to said nut, when the lever is not being used for turning, to minimize the overall diametral dimension to allow slippage over the nut device by a work piece or tool.

Specification

This invention relates generally to novel improvements in a wingnut and more particularly to a collapsible wingnut device.

Wingnuts are generally used for fastening or tightening operations by manual manipulation and especially when the operation calls for frequent disconnecting or loosening of the wingnut. The wingnut includes an integral lever means so that rotation of the nut portion may be readily accomplished without the assistance of tools. In certain applications however, this principal feature of the wingnut, that is, the wing structure enabling rapid and ready manual manipulation, is inadequate to provide a nut for a wide range of applicability because an integral structure providing for a large leverage will result in a large wing and conversely, a nut having a wing size limited for a certain job application will have a correspondingly limited leverage capability. The job application I have in mind is that for plugging a gas pipe to prevent the escape of gas. Gas lines are frequently severed in the field to interpose between the severed ends equipment such as valves, meters, regulators, and the like. If cuts are made in the gas line on the low pressure side of a valve, no problem arises since the valve may be closed and the severed ends may be worked on in ease and safety. However, it frequently occurs that installation of equipment is required in a gas line on the pressure side of a valve. In such cases, after the pipe is cut through, the severed end containing the gas under pressure must temporarily be quickly and effectively plugged to prevent the escape of gas in order to permit workmen to prepare the severed ends to receive equipment therebetween. As partially shown in FIGURE 1 of the drawings, a typical means for plugging a gas pipe comprises a plunger having at the end thereof a flexible cylindrical body mounted at the end of a shaft. The flexible cylindrical body formed from material such as hard rubber is retained on the shaft end by means of a collar fixed to the end of the shaft at one end of the cylindrical body, and a collar axially movable on the shaft at the other end of the cylindrical body. A longitudinal sleeve is provided over the shaft, one end thereof abutting against the movable collar and the other end of the sleeve overhanging a portion of the threaded end of the shaft. This other end of the longitudinal sleeve is adapted to abut against the advancing face of a conventional wingnut threadily engaging the threaded end of the shaft so that by tightening the wingnut against the longitudinal sleeve over the shaft, the forward end of the sleeve abutting the axially movable collar will cause a longitudinal shortening of the flexible cylindrical body and a consequent radial thickening thereof to press fit within the bore of the pipe and thereby plug the pipe to prevent escape of gas.

Since this operation must be performed quickly, it is desirable to provide a wingnut which is easily tightened by hand, rather than by means of a separate tool such as a wrench or pliers, since such separate tools easily fall out of adjustment at the crucial time of tightening thereby requiring adjustments under pressure of escaping gas. Also time is consumed during frequent removal and application of the wrench or pliers to the nut body to accomplish rotation thereof. The above objective may be obtained by providing a wingnut with a wing dimension of sufficient length to provide the leverage necessary to expandingly tighten the cylindrical body to the pipe manually. However, this would require a wing lever of such length that it will exceed the diameter of the gas pipe line thereby preventing the slipping thereover of a tool such as a die necessary to form threads for connecting a coupling means for the equipment to be interposed between the severed ends of the gas pipe.

My invention comprises a wingnut of a new and novel construction which provides a wing lever of sufficient length to enable a user to manually tighten the nut with sufficient force to axially compress a hard rubber cylindrical body to cause it to radially expand and effectively plug a pipe containing gas under high pressure, after which its position may be altered to reduce the lever's radial dimension to a dimension less than the diameter of the gas pipe to be worked. This permits slippage thereover of a tool such as a die for preparing the severed end of the pipe with threads, as well as a valve means thereover to connect the threadedly prepared end of the pipe so that upon removal of the plug, the valve connected to the pipe may be closed to stop gas escaping. Work may then be done in a conventional manner to install equipment between the severed ends of the pipe line.

Accordingly, the principal object of this invention is to provide a hinged wingnut to enable the accomplishment of the above operation.

Another object of this invention is to provide a hinged wingnut which is simple, easy and economical to manufacture.

Other objects and advantages of this invention will become apparent by studying the following specification taken together with the accompanying drawings in which.

Figure 1:
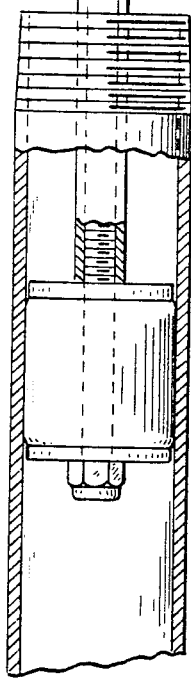
FIGURE 1 is a side elevation of this invention shown in an operative relation in an application requiring high leverage capability and a small diametral dimension.
Figure 2:
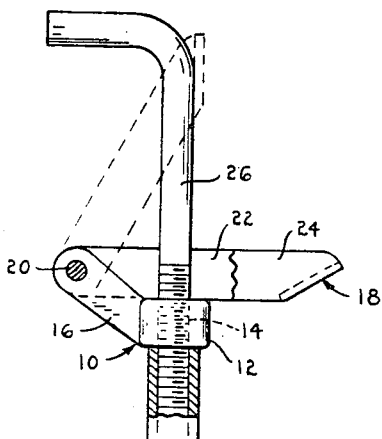
FIGURE 2 is a pictorial view of the wingnut of my invention revealing the end view thereof.
Figure 2:
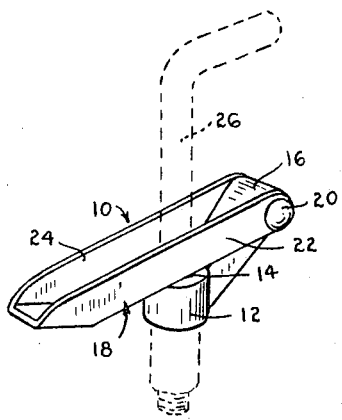
Figure 3:
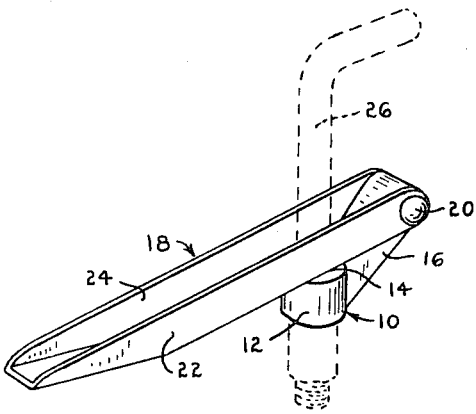
FIGURE 3 is another pictorial view of the wingnut of my invention showing a structure having an increased leverage capability while maintaining the same small radial dimension of FIGURE 2.

Referring now to the drawings, my invention comprises an improved wingnut designated generally in the drawings by numeral 10. It comprises a body 12 having a threaded central hole 14 and a projection 16 radially extending from the side thereof. A lever 18 bifurcated in structure and generally U-shaped is pivotly connected to the distal end of projection 16 by means of pin 20. The dimension of projection 16 taken with the diametral dimension of body 12 are such so as not to exceed a selected dimension while lever 18 can be made any length to provide sufficient leverage to turn nut 10 against a specified force. The legs 22 and 24 of U-shaped lever 18 are connected to body 12 to straddle the hole 14 in its longitudinal direction. When nut 10 is tightened or loosened on shaft 26, shaft 26 serves as a fulcrum against which leg 22 or 24 acts to rotate nut 10 when applying a manual rotative force against the hand end of lever 18. When it is necessary to pass a tool or a coupling device such as a die or pipe as heretofore described, over nut 10, lever 18 is pivotly moved so that the handle end thereof is positioned adjacent shaft 26 thereby reducing the effective diametral length of nut 10 to less than the internal diameter of the die or pipe which is intended to pass thereover.

It is apparent from the above description that the nut of my invention is provided with a lever of a small fixed dimension to enable a small diameter sleeve means to pass thereover, and a movable lever of sufficient length and form to provide turning leverage of great force and which may be pivoted toward a longitudinal position to allow passage thereover of the sleeve means. Accordingly, I provide a novel wingnut which incorporates the advantages of a small wingnut regarding size and the advantages of a large wingnut regarding turning leverage.

It is understood that changes and modifications may be made in the structure of the nut device of my invention without departing from the spirit thereof. Accordingly, what I desire to protect is the nut device of my invention which falls within the fair scope of the following appended claim.

I claim:
1. A wingnut device comprising:
   a nut having a threaded hole;
   a lug extending outward from the side of said nut,
      said lug being inclined with the distal end thereof extending axially beyond one end surface of said nut;
   a lever hingedly connected at one end thereof to the distal end of said lug,
      said lever being shaped in the form of a U and the legs thereof connecting the distal end of said lug straddling said lug,
      said legs of said lever being spaced apart the length thereof at least the width of said threaded hole and less than the width of said nut,
      said lever being movable to a position perpendicular to the nut axis,
         said lever extending a substantial distance beyond the side of said nut opposite to the lug when said lever is perpendicular to said nut axis, and
      the end of said lever being axially spaced from the opposite end surface of said nut in all positions of said lever.

References Cited
UNITED STATES PATENTS

| | | | |
|---|---|---|---|
| 556,755 | 3/1896 | Kelly | 85—32 |
| 1,297,113 | 3/1919 | Domenico | 85—32 |
| 1,988,240 | 1/1935 | Ellis | 85—32 |

EDWARD C. ALLEN, *Primary Examiner.*